April 24, 1934. J. A. MacLEAN 1,955,924
WATER-TIGHT BOLT
Filed Sept. 24, 1930
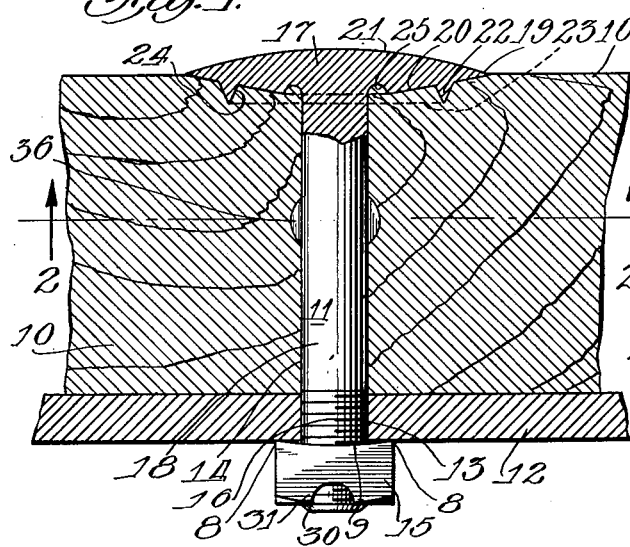
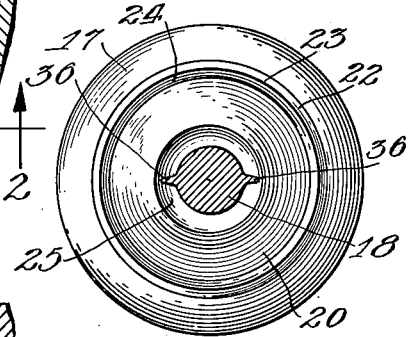
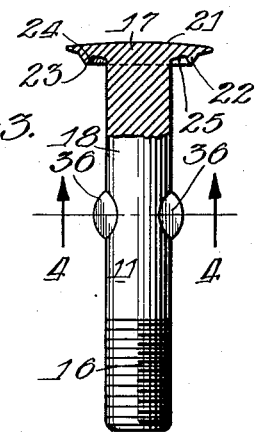
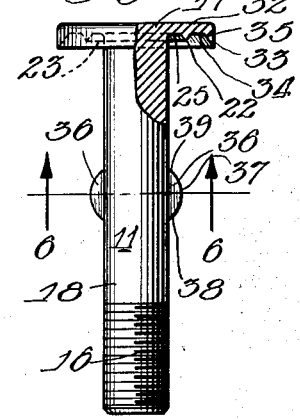
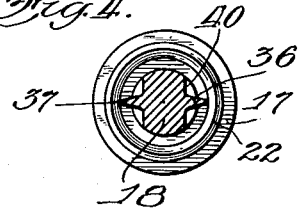
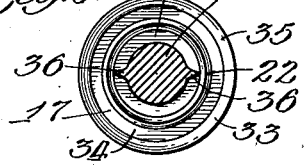

Patented Apr. 24, 1934

1,955,924

UNITED STATES PATENT OFFICE 1,955,924

WATER-TIGHT BOLT

John A. MacLean, Chicago, Ill., assignor to MacLean-Fogg Lock Nut Company, Chicago, Ill., a corporation of Illinois Application September 24, 1930, Serial No. 484,008

1 Claim. (Cl. 85—9)

The present invention relates to bolts, and is particularly concerned with improvements in water-tight bolts for use in railway freight and passenger cars, and industrial cars and the like.

While the present invention is of particular importance in connection with railway freight cars, it should be understood that the present bolt is capable of universal use and will be found advantageous wherever it is desirable to effect a water-proof or water-tight seal about the head of the bolt, or where it is desirable to utilize any of the other novel features of the bolt.

The railway freight cars of the prior art, which have their wooden sheathing secured by ordinary bolts, such as carriage bolts, are subject to the disadvantage that the wooden sheathing must be countersunk to receive the heads of the carriage bolts. In countersinking for the heads of the bolts, the edges around the countersunk holes are nearly always ragged and splintered. These ragged and splintered edges are the cause of loss and damage to lading contained in sacks, such as flour, sugar, cement, etc. It is, therefore, a desideratum in freight cars, that all fastening devices for sheathing, floors and any other portion of cars where bolts extend from inside to outside of car, they be installed with the heads flush with the surface of the wood. It also should be borne in mind that countersinking of the wood cuts a great deal of it away, thus materially decreasing its strength.

Another disadvantage of the prior art bolts is that water leaks in past the heads of the bolts so that the lumber soon begins to rot beneath the bolt head. The sheathing becomes loose, holes are formed in the sides and floors of the car, permitting leakage of the cargo such as grain, etc. The water which leaks past the bolt heads often causes damage to the cargo.

One of the objects of the present invention is the provision of an improved water-tight bolt of the same general type covered by my prior application, Serial No. 423,011, filed January 24, 1930.

Another object of the invention is the provision of an improved car construction including water-tight fastening devices for sheathing, flooring, roofing and other portions of cars where bolts extend from inside to outside, for the purpose of eliminating looseness and rotting of the lumber about the bolts.

Another object is the provision of an improved bolt having a head adapted to be drawn into sealing engagement with the lumber, so as to eliminate the difficulties brought about by leakage of water past the head of the bolt.

Another object is the provision of a bolt of the class described, in which the head is adapted to be drawn substantially flush with the wood surface, thus eliminating the operation of countersinking, which is necessary with carriage and other types of sheathing or flooring bolts, and to aid in effecting a water-proof seal about the head of the bolt.

Another object is the provision of a bolt for use in coal mine pit and conveying cars and the like. Cars of this class are fastened with carriage bolts, the heads of which project inside of the cars. In dumping the load, a great deal of coal is crushed and broken up by these carriage head bolts. This degrades the coal. With the use of the improved bolt, the inside surfaces of the cars would be smooth, thus eliminating breakage and degrading.

Another object of the invention is the provision of an improved wood bolt having a head which is provided with integral formations adapted to confine and compress the wood about the bolt underneath the head, in order to form a substantially perfect water seal, as distinguished from the bolts of the prior art, the effect of which is to force the wood away from the bolt and head as the bolt is drawn into the wood.

Another object of the invention is the provision of an improved form of water-tight bolt in which the shank of the bolt may be made round underneath the head, if desired, in order to accomplish a greater uniformity of sealing action by means of the improved head construction, than can be accomplished by the devices of the prior art.

Other objects and advantages of the invention will be apparent from the following description and from the accompanying drawing, in which similar characters of reference indicate similar parts throughout the several views.

Referring to the single sheet of drawing;

Fig. 1 is a sectional view taken through a part of railway car, showing wooden flooring or sheathing secured with a bolt constructed according to the present invention;

Fig. 2 is a sectional view of the bolt, taken on the plane of the line 2—2 of Fig. 1;

Fig. 3 is a view similar to Fig. 1 of a modified form of bolt, per se;

Fig. 4 is a view similar to Fig. 2, taken on the line 4—4 of Fig. 3;

Fig. 5 is a view similar to Fig. 1, of another modified form of bolt; and

Fig. 6 is a sectional view taken on the plane of the line 6—6 of Fig. 5.

Referring to Fig. 1, this figure shows an installation which is exemplary of one of the many forms in which the invention may be utilized, the flooring or sheathing 10 being secured in place by a plurality of bolts 11, which pass through metal sills, braces or framework 12. The present bolts may be used with any kind of lumber, but where a tight construction is desirable, some form of tongue and groove lumber is usually employed.

The metal supporting member 12 is provided with a bore 13 of sufficient size to receive the bolt 11, and the lumber may be bored with ordinary cylindrical holes 14 of the same size or preferably slightly smaller than the bolt 11. Any form of nut 15 or other threaded member may be employed, which is capable of cooperating with the complementary threaded portion 16 formed on the bolt 11, and it should be understood that if desired, the threaded bore may be formed in the bolt and the nut provided with a male threaded portion.

The present bolt is peculiarly adapted to be used with tight fitting nuts, and has particular advantages when employed in connection with unit lock nuts, on account of the improved features of construction of the bolt, which positively prevent the turning of the bolt.

The unit lock nut 15 illustrated, preferably comprises a nut having a concave surface 9 on its lower side, forming relatively sharp edges 8 for engaging the frame members 12 or other parts to be secured. The nut 15 is also provided with a transverse groove 30 in its upper surface, the groove 30 being of less width than the diameter of the bolt 11, thereby providing the nut 15 with axially extending legs 31, adapted to grip the adjacent sides of bolt 11 when nut 15 is screwed home and the body of the nut is flexed along a line parallel to the groove 30. The present unit lock nut is to be regarded as exemplary of one of the forms of tight fitting nuts for which the present type of bolt is peculiarly adapted, but other forms of tight fitting nuts may also be employed.

The bolt 11 preferably includes a head 17, a cylindrical body portion 18, and the threaded portion 16. The head 17 is preferably circular in shape and tapered in thickness from the body of the bolt out towards the outer edge 19 of the head. Thus, the lower surface 20 of the head slopes slightly upward away from the body 18.

The top surface 21 of the head is preferably, but not necessarily, convexly curved, the curvature being slight in order to prevent the formations of projections on the surface of the lumber, but the curvature being sufficient to give sufficient body to the head for the necessary strength. It should be understood, however, that the shape of the upper surface of the head may be changed, while still utilizing the other features of the present invention, and the head may be made entirely flat at the surface 21, if desired.

The lower surface 20 of the head is preferably provided with an integral annular ridge or camming formation 22, extending completely about the head, and the ridge 22 is preferably of substantially the shape shown, but these ridges may be made V-shaped, oval or any other shape which is capable of accomplishing the purposes herein set forth, and the exact formation of the ridges and grooves herein illustrated is to be regarded as exemplary of a few of the many forms which these parts may take.

The apex 23 of the ridge 22 defines a circle, the center of which preferably lies in the axis of the bolt, and the ridge is preferably spaced sufficiently from the body of the bolt to effect a sealing engagement with the lumber 10 at a point spaced from the bore 14. The ridge 22 forms one of the sealing surfaces, which make the head of the bolt 11 water-tight, and the inner surface 24 of the ridge 22 is also adapted to confine the adjacent parts of wood 10 and cam the wood inward against the body 18 of the bolt and upward into groove 25.

The bolts constructed according to the present invention are preferably provided with annular grooves 25 located in the lower side of the head between the body 18 and ridge 22, and the surface of groove 25 forms an additional water seal on the under side of the head of each bolt.

In the embodiment of Fig. 1, the groove 25 is located immediately adjacent the cylindrical shank 18 and the sealing member 22 is located substantially midway between the outer edge 19 of the head and the groove 25.

In the embodiment of Fig. 3, the head 17 has been made smaller in size, and the wood adjacent the shank 18 is compressed in the groove 25 between the sealing ridge 22 and the shank.

In the embodiment of Fig. 5, the head 17 has been provided with an upper flat surface 32 and formed with a plurality of sealing ridges 22, 33, separated by grooves or depressions 25, 34. In this embodiment, the sealing ridge 33 is located at the boundary of the head 17 and is provided with a camming surface 35 which is adapted to cam inward and compress all of the adjacent wood beneath the head 17.

If desired, the bolts so far described may be provided with the customary square shank used in carriage bolts, but in order to accomplish the greatest degree of uniformity of sealing action by means of the improved head construction, the bolts are preferably provided with laterally projecting fins 36 carried by the shank 18 and having their edges 37 extending axially of the bolt 11.

In the embodiments of Figs. 1, 2, 5 and 6, the fins have been forged upon the bolt at the time it is made, and consequently the bolt may be provided with a substantially uniformly cylindrical shank 18 having the fins 36 projecting radially therefrom. The fins are preferably curved from one end 38 to the opposite end 39, being tapered in width so as to facilitate the driving of the bolt into a closely fitting bore in the wood 10. The fins 36 are also preferably tapered from the body or shank 18 of the bolt toward the outer edges 37 of the fins, so that the bolt may be driven into the wood and located with the fins embedded in the wood substantially below the head 17, without damaging the wood surrounding the bore 14 underneath the head 17.

In the embodiment illustrated in Figs. 3 and 4, the fins 36 have been formed by the secondary operation of raising the fins 36 from the shank 18 of the bolt, thereby incidentally forming depressions 40 in the shank 18 adjacent fins 36 in pressing out the metal to form fins. It should be noted, however, that the remainder of the shank 18 may still be made substantially cylindrical so as to effect a tight fit in the bore 14 in the wood, and prevent any damage to the wood immediately below the head 17 in the driving of the bolt.

The fins 36 in any case may be embedded in the wood by the driving of the bolt into the wood, or by the operation of tightening the nut and the fins are adapted to prevent turning of the bolt during the tightening of the nut or thereafter, so that when the head has been drawn into sealing engagement with the wood, this sealing relation is not disturbed or broken by the subsequent tightening of the bolt or other operations, and it is unnecessary to provide the bolt with a square shank. The elimination of the square shank enables the provision of a smaller head while still providing a sealing member on the lower side of the head, which is capable of camming the adjacent wood underneath the head and compressing the wood between the sealing member and the shank, and the elimination of the square shank also enables the accomplishment of substantially uniform sealing action at all points underneath the head.

In the preferred form of the invention, a pair of fins located diametrically opposite to each other are employed and the fins are preferably so arranged when more than one fin is employed, in order that both fins may extend longitudinally of the grain. It should be understood, however, that only a single fin may be employed, if desired, or any number of fins, preferably symmetrically located may also be employed.

The fins 36 may be located on the shank 18 between the head and threaded portion 16, at any point, but the fins are preferably located substantially below the head or midway between the head and threaded end of the bolt, as shown. The location of the fins substantially below the head, prevents any interference between the fins and the uniform sealing action of the head on the wood immediately beneath the head.

The operation and installation of the present bolt, are as follows.

The lumber 10 is preferably provided with a bore 14 which is slightly smaller than the shank 18 of the bolt to provide a close fit, and the bolt 11 may be driven into the bore as far as possible, with a hammer or other driving tool. During this operation, the fins 36 spread the wooden fibers apart and by means of the camming surfaces on the fins, these fins form space for themselves in the wood adjacent the bore, the wood fibers springing together again after the fins have passed. The bolt is preferably located so that the fins extend longitudinally of the grain, thereby enabling the fins to spread the fibers more readily.

The nut 15 may then be placed on the threaded portion 16 of the bolt and the nut threaded home by means of a wrench or other tool, during which operation the bolt will be gradually drawn into the bore 14, the head embedding itself in the surface of the lumber about the bore, until the head is preferably substantially flush with the surface of the lumber.

During this operation, the fins 36 prevent the rotation of the bolt and tend to maintain the sealing ridge in continuous engagement with the adjacent wood, without any rotation.

In the formation of bolts according to the methods used for quantity production, certain irregularities may appear in the sealing ridges 22 and it is therefore desirable that the bolt be provided with an axial motion and that rotation be positively prevented, so that the parts of the bolt head are continuously in engagement with the complementary formations of wood which are produced by the completion of the wood.

As the bolt 11 is drawn into the wood, the sealing ridge 22 compresses the fibers of lumber and confines a substantial portion of the lumber immediately adjacent the shank 18 underneath the head, the inner camming surface of the ridge 22 compressing the wood underneath the head. The lumber underneath the head is forced into a shape complementary to the lower side of the head, and is compressed into sealing engagement with the lower side of the head in such manner that a substantially perfect water-proof seal is formed.

It should be noted that the nut 15 and threads 16 constitute a force multiplying device for effecting the sealing engagement between the head and the lumber, as well as means for permanently securing these parts in sealing engagement, and any kind of nut, including lock nuts or lock washers, may be employed for this purpose.

It will thus be observed that I have invented an improved bolt, which has peculiar advantages when used in connection with refrigerator cars, for the reason that it is highly desirable to avoid leakage of water into the holes about the bolts in such cars. The present bolts effect a substantial improvement in the life and serviceability of cars which are equipped with such bolts, and the bolts are adapted to prevent leakage and enable the lumber to give good service for a much longer period of time than the devices of the prior art. When the present bolts are employed with relatively hard wood, the heads of the bolts provide a perfectly waterproof seal, which prevents water from leaking through the floor, damaging the installation and rotting the lumber.

It is of the utmost importance that the insulation of refrigerator cars be kept dry in order to maintain the insulating value, and particularly on account of the fact that the insulation is enclosed between the walls of the car where it will not dry out very quickly should it ever become wet.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim is new and desire to secure by Letters Patent of the United States, is:

A water-tight bolt comprising a substantially cylindrical shank having a pair of diametrically opposite fins carried by said shank and extending longitudinally of the axis of said bolt and a head carried by said shank and adapted to effect a sealing engagement with the wood of the body to be secured by said bolt, said fins being adapted to prevent the rotation of said bolt during the tightening operation, said head being formed with an annular groove immediately adjacent said shank and having an annular ridge on the lower side of said head between said groove and the outer edge of said head.

JOHN A. MacLEAN.